Figure 1:
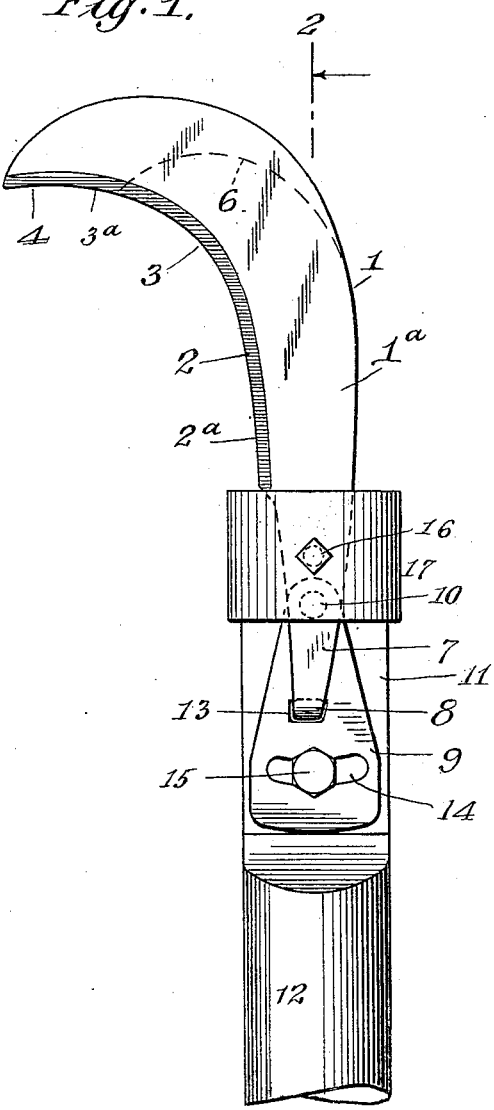

R. W. DUNN.
BUSH HOOK.
APPLICATION FILED FEB. 9, 1909.

961,218.

Patented June 14, 1910.

WITNESSES

Reuben W. Dunn INVENTOR

UNITED STATES PATENT OFFICE.

REUBEN W. DUNN, OF WATERVILLE, MAINE, ASSIGNOR TO DUNN EDGE TOOL COMPANY, OF OAKLAND, MAINE, A CORPORATION.

BUSH-HOOK.

961,218.  Specification of Letters Patent.  Patented June 14, 1910.

Application filed February 9, 1909. Serial No. 476,996.

*To all whom it may concern:*

Be it known that I, REUBEN W. DUNN, a citizen of the United States, residing in the city of Waterville, county of Kennebec, and State of Maine, have invented new and useful Improvements in Bush-Cutting Implements, known to the trade as "Bush-Hooks."

My improved bush hook is so proportioned that it gives a more effective cutting edge, is more readily attached to the handle, or snathe, and is provided with a shank and tang adapted to co-act with the fastening means of the ordinary scythe snathe, thereby making it interchangeable with the scythe blade of said snathe, and saving the user the expense of an extra snathe.

One of the objects of my invention is to provide a bush hook with fastening means by which it may be attached to an ordinary scythe snathe.

A further object is to so shape the cutting edge as to get an efficient purchase on the bush to be cut.

A still further object is to decrease the expense of manufacture by having the fastening means integral with the bush hook so that it may all be punched from one piece of metal, thereby eliminating the cost of assembling, which is an important item.

Having set forth the objects of my invention I will describe it in detail in connection with the accompanying drawings forming part of this specification, in which similar reference characters represent similar parts in the two views.

Figure 2:
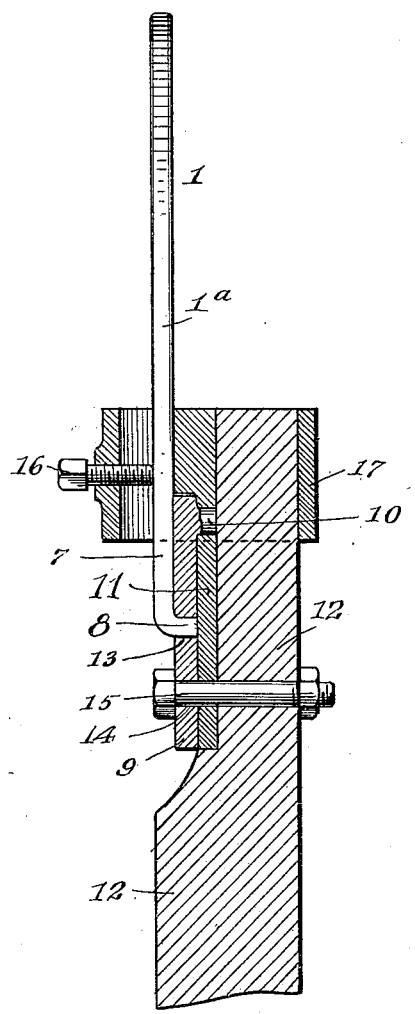

Figure 1 is a side elevation of my improved bush hook fastened to a scythe snathe. Fig. 2 is a sectional view on the line 2—2 of Fig. 1, the bush hook being shown in elevation.

The bush hook 1 consists of a body portion $1^a$, having a cutting edge 2, which is substantially vertical as at $2^a$, and curves around at 3 substantially to the horizontal at $3^a$ and then curves slightly downward from the horizontal and terminates in the hook-like end 4. The horizontal portion and hook-like end afford a good hold, or purchase, on the bush to be cut, and prevent the bush hook from slipping. This is obviously an improvement over the bush hooks now made, the ends of which terminate substantially as shown by the dotted line 6, and therefore have no appreciable horizontal cutting edge or hook.

Downwardly extending from the body portion $1^a$ of the bush hook 1 is a shank 7, the end of which is bent substantially at right angles to plane of said shank and forms the tang 8, (see Fig. 2). With the above shank 7 and tang 8 the bush hook may be fastened to an ordinary scythe snathe as described below.

The fastening means of a common form of scythe snathe consists of plate 9 pivoted at 10 to a plate 11 which may be fastened by suitable means to the snathe 12. The plate 9 has an eye 13 into which the tang 8 may fit; and a slot 14 to permit its being adjusted and fastened in different positions by the bolt 15. The ring 17 carries a set screw 16 which may bear on the shank 7 and securely hold the bush hook in place, as shown.

I do not wish to limit myself to the exact construction shown and described, as it is obvious that constructive changes may be made without departing from the spirit and scope of my invention.

Having now described my invention, what I claim is:

A bush hook comprising a handle having a flattened end portion, a blade extending from said end thereof and in line therewith, the inner end of the blade being inturned, a pivoted plate having a slot in one end thereof and an intermediate opening lying on said flattened end portion, a bolt passing through the handle and the slot of said pivoted plate whereby the plate may be locked in a plurality of positions, the inturned end of the blade engaging the intermediate opening in the pivoted plate; a ferrule on the end of the handle, through which the shank of the blade extends, and a bolt passing through the ferrule and normal to the shank of the blade and in engagement therewith for holding the blade in position.

REUBEN W. DUNN.

Witnesses:
ABNER R. SMALL,
M. I. MANSON.